US00RE48911E

(19) United States
(12) Reissued Patent
Teng et al.

(10) Patent Number: US RE48,911 E
(45) Date of Reissued Patent: Feb. 1, 2022

(54) APPLICATION PROGRAMMING INTERFACE FOR PROVIDING NATIVE AND NON-NATIVE DISPLAY UTILITY

(71) Applicant: Spring Design, Inc., Cupertino, CA (US)

(72) Inventors: Albert Teng, Cupertino, CA (US); Jack Yuan, Cupertino, CA (US); Xiao Bin, Cupertino, CA (US)

(73) Assignee: Spring Design, Inc., Fremont, CA (US)

(21) Appl. No.: 16/148,620

(22) Filed: Oct. 1, 2018

Related U.S. Patent Documents

Reissue of:
(64) Patent No.: 9,836,264
Issued: Dec. 5, 2017
Appl. No.: 14/569,759
Filed: Dec. 14, 2014

U.S. Applications:
(63) Continuation of application No. 14/043,495, filed on Oct. 1, 2013, now Pat. No. 8,959,535, which is a (Continued)

(51) Int. Cl.
*G06F 3/14* (2006.01)
*G06F 9/451* (2018.01)
*G06F 9/44* (2018.01)

(52) U.S. Cl.
CPC ..... *G06F 3/1415* (2013.01); *G06F 3/1423* (2013.01); *G06F 3/1454* (2013.01); *G06F 9/44* (2013.01); *G06F 9/451* (2018.02)

(58) Field of Classification Search
CPC .... G06F 3/1415; G06F 3/1454; G06F 3/1423; G06F 9/44; G06F 9/451; G09G 2340/0435
See application file for complete search history.

(56) References Cited

U.S. PATENT DOCUMENTS 5,488,572 A 1/1996 Belmont
5,493,335 A 2/1996 Parulski et al.
(Continued)

FOREIGN PATENT DOCUMENTS

EP 1205824 A2 5/2002

OTHER PUBLICATIONS

Apple Remote Desktop Administrator's Guide, Version 3, 2006, p. 184, Apple Computer, Inc.
(Continued)

*Primary Examiner* — Majid A Banankhah
(74) *Attorney, Agent, or Firm* — Fenwick & West LLP

(57) ABSTRACT

Systems are presented including: a first electronic device operative to receive a first input, the first electronic device including: a first data communication unit operative to connect the first electronic device to a second electronic device; and a first processing unit operative to process the first input to generate information representing at least a portion of a first intended display, and operative to establish at least one communication channel between the first and second electronic devices using the first data communication unit operative and to call at least one application programming interface to forward the information representing the at least the portion of the first intended display to the second electronic device for display, and further operative to receive and process a representation of a second input from the second electronic device.

12 Claims, 8 Drawing Sheets

Related U.S. Application Data continuation of application No. 13/741,935, filed on Jan. 15, 2013, now Pat. No. 8,566,848, which is a continuation of application No. 13/073,846, filed on Mar. 28, 2011, now Pat. No. 8,370,860, which is a continuation of application No. 12/033,608, filed on Feb. 19, 2008, now Pat. No. 7,926,072.

(60) Provisional application No. 60/997,255, filed on Oct. 1, 2007.

(56) References Cited

U.S. PATENT DOCUMENTS 5,847,698 A 12/1998 Reavey et al.
6,336,161 B1 1/2002 Watts
6,353,700 B1 3/2002 Zhou
6,628,244 B1 9/2003 Hirosawa et al.
6,630,943 B1 * 10/2003 Nason ..... G09G 1/16 715/746
6,717,596 B1 * 4/2004 Nason ..... G06F 3/038 715/788
6,727,918 B1 * 4/2004 Nason ..... G06F 3/038 715/791
6,892,359 B1 * 5/2005 Nason ..... G06F 3/038 715/788
6,931,265 B2 8/2005 Reyes et al.
7,581,034 B2 * 8/2009 Polivy et al. ..... 709/250
7,631,267 B2 * 12/2009 Viji et al. ..... 715/763
7,634,780 B2 * 12/2009 Rhoten et al. ..... G06F 3/14 345/1.1
7,711,868 B2 * 5/2010 Rhoten et al. ..... 710/15
7,748,634 B1 7/2010 Zehr et al. ..... G06F 3/0485 235/492
7,784,065 B2 * 8/2010 Polivy et al. ..... 719/328
7,973,738 B2 7/2011 Teng et al.
2001/0043234 A1 * 11/2001 Kotamarti ..... G06F 9/451 715/746
2002/0067319 A1 6/2002 Hensel
2002/0126133 A1 9/2002 Ewins
2002/0149541 A1 10/2002 Shin
2002/0158812 A1 10/2002 Pallakoff ..... H04M 1/0233 345/5
2003/0011534 A1 1/2003 Rengan et al.
2003/0160771 A1 8/2003 Fraser et al.
2004/0190080 A1 9/2004 Kodama et al.
2004/0019621 A1 10/2004 Nagatsuka et al.
2004/0196210 A1 10/2004 Nagatsuka et al. ... G06F 3/1423 345/1.1
2004/0225613 A1 11/2004 Narayanaswami et al.
2004/0257367 A1 12/2004 Smith et al.
2005/0091302 A1 * 4/2005 Soin ..... H04W 4/50 709/200
2005/0225556 A1 10/2005 Booth
2005/0243020 A1 * 11/2005 Steeb ..... G06F 3/14 345/1.3
2006/0017659 A1 1/2006 Ogawa et al.
2006/0050090 A1 3/2006 Ahmed et al.
2006/0077127 A1 4/2006 Sampsell et al.
2006/0083194 A1 4/2006 Dhrimaj et al.
2006/0129855 A1 * 6/2006 Rhoten ..... G06F 1/3203 713/320
2006/0146056 A1 7/2006 Wyatt
2006/0161977 A1 7/2006 Jung et al.
2006/0164324 A1 * 7/2006 Polivy et al. ..... 345/1.1
2006/0176271 A1 * 8/2006 Polivy et al. ..... 345/156
2006/0187142 A1 * 8/2006 Lesniak ..... G09G 5/393 345/1.1
2006/0197724 A1 9/2006 Sakai
2006/0242590 A1 * 10/2006 Polivy et al. ..... 715/760
2007/0046562 A1 * 3/2007 Polivy et al. ..... 345/1.2
2007/0052615 A1 * 3/2007 Van Dongen et al. ..... 345/1.1
2007/0118671 A1 5/2007 Ganti
2007/0174918 A1 7/2007 Hirose et al.
2007/0182663 A1 8/2007 Biech ..... G06F 1/1654 345/1.1
2007/0242061 A1 * 10/2007 Rhoten et al. ..... 345/204
2008/0033996 A1 2/2008 Kesari
2008/0008001 A1 4/2008 Korst
2008/0080010 A1 4/2008 Korst
2008/0256468 A1 10/2008 Peters et al.

OTHER PUBLICATIONS

Richardson et al., "Virtual Network Computing," IEEE Internet Computing, vol. 2, No. 1, Jan./Feb. 1998, p. 7.
International Search Report and Written Opinion, PCT/US07/78208, Mar. 25, 2008, 14 pages.
International Search Report and Written Opinion, PCT/US07/78209, Mar. 25, 2008, 8 pages.

* cited by examiner

APPLICATION PROGRAMMING INTERFACE FOR PROVIDING NATIVE AND NON-NATIVE DISPLAY UTILITY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

[This application] *The present application is a Reissue of application Ser. No. 14/569,759, filed Dec. 14, 2014 and issued as U.S. Pat. No. 9,836,264 on Dec. 5, 2017. Application Ser. No. 14/569,759* is a continuation of U.S. patent application Ser. No. 14/043,495 filed on Oct. 1, 2013, *now U.S. Pat. No. 8,959,535*, which is a continuation of U.S. patent application Ser. No. 13/741,935 filed on Jan. 15, 2013, *now U.S. Pat. No. 8,566,848*, which is a continuation of U.S. patent application Ser. No. 13/073,846 filed on Mar. 28, 2011, *now U.S. Pat. No. 8,370,860*, which is a continuation of U.S. patent application Ser. No. 12/033,608, filed on Feb. 19, 2008, *now U.S. Pat. No. 7,926,072*, which claims the benefit of U.S. Provisional Application No. 60/997,255 filed on Oct. 1, 2007, each of which is hereby incorporated by reference in its entirety.

BACKGROUND

LCD-based electronic devices such as Ultra Mobile PC (UMPC), laptops/PCs, personal digital assistants (PDAs), cellular phones, portable digital media players, and the like are becoming ubiquitous in modern technological societies. These devices offer specialized functionality in form factors small enough to carry in a pocket or some other small carrying bag. At least one reason why these types of devices are so popular is because display technology, which provides a convenient user interface, has advanced to a point where relatively small form factors are efficient and inexpensive. Indeed, even the most inexpensive portable electronic devices now include high frame rate color displays. However, conventional displays are not without some disadvantages.

Typically, a PDA may include a refresh-based, high frequency (REHF) display for displaying user selected information. One example of an REHF display is a liquid crystal display (LCD). LCDs have many desirable characteristics including high frame rates which provide for a satisfying visual experience when rapidly switching between screens or when scrolling across a screen. However, typical displays having high screen refresh rates may suffer from poor readability because backlights, which are required in those displays, may be adversely affected by ambient lighting conditions. Eye strain is commonly reported by users and has been documented in some medical literature. Users of UMPCs or PDAs are familiar with the poor readability of LCDs under bright light or direct sunlight. In some examples, shading the screen or moving to a darker environment may be necessary to read an LCD. In other examples, LCD cannot offer high quality image such as EPD which has close to 300 dpi today.

In order to overcome the shortcomings of an LCD, bistable, low frequency (BILF) displays may be utilized instead of an LCD. One example of a BILF display is an electronic paper display (EPD). EPDs utilize a material called electronic ink and are commercially available under the trade name E INK®. EPDs are ideally suited for flexible display applications due to their thin form factor and inherent flexibility. EPDs provide an image stable reflective display technology that uses ultra-low power but is easily read under any lighting condition including direct sunlight. In addition, EPDs provide a bistable display and unlike LCDs, an image on an EPD looks the same from all viewing angles. Further, EPDs will not distort when touched or flexed, making EPDs the ideal display medium for flexible displays and portable devices. EPDs however, cannot, in many examples, completely replace LCDs. At least one reason is because EPDs typically have a low frame rate. As noted above, conventional LCDs are typically configured with high frame rates, which may serve to enhance a user's viewing experience especially when rapidly scrolling through multiple displays. In addition, using a mouse requires high frame rates so that the mouse pointer appears to have smooth movement across a screen. Furthermore, a majority of reading content is currently created for viewing with an REHF display application such as an LCD application while few applications are written for BILF displays such as an EPD. This trend is likely to continue. It may, therefore, be advantageous to easily display the output of existing REHF display applications on BILF displays such as an EPD.

Unfortunately, Conventional operating system windows managers are typically configure to manage only multiple LCD task windows across multiple LCD displays. Thus, conventional solutions for REHF-based (LCD) applications on conventional platforms can not generally benefit from the use of multiple BILF and REHF displays. As such, application programming interfaces for providing native and non-native display utility are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, systems are presented including: a first electronic device operative to receive a first input, the first electronic device including: a first data communication unit operative to connect the first electronic device to a second electronic device; and a first processing unit operative to process the first input to generate information representing at least a portion of a first intended display, and operative to establish at least one communication channel between the first and second electronic devices using the first data communication unit operative and to call at least one application programming interface to forward the information representing the at least the portion of the first intended display to the second electronic device for display, and further operative to receive and process a representation of a second input from the second electronic device, where the second input is a representation of a second device input entered by a user at the second electronic device, through the at least one communication channel established between the first and second electronic devices, and to call the at least one application programming interface to forward the information representing at least a portion of a second intended display to the second electronic device for displaying at least the second intended display, where the second input is received from the second electronic device in response to the information representing the at least the portion of the first intended display through the at least one communication channel established between the first and second electronic devices, and where the second intended display is at least an update to the first intended display to be displayed at the second electronic device in response to the second device input by the user. In some embodiments, the first electronic device generates information representing synchronized intended displays to be viewed by the user at the first electronic device and the second electronic device. In some embodiments, the first input is an event selected from the group consisting of: a graphical user interface input, a physical user input and a programmatic input. In some embodiments, the at least one communication channel between the first and the second electronic devices is selected from the group consisting of: a command, an application program interface (API) call, a callback function call, a pipe, a signal, a message, a shared memory, a semaphore, a mutex, a critical section, an event, a socket, a clipboard, a message, and a message queue. In some embodiments, the forwarding of the information representing the at least the portion of the first intended display to the second electronic device is through communication channels between the first and second electronic devices. In some embodiments, the second input from the second electronic device includes a navigation command to navigate content generated from the first electronic device and displayed on the second electronic device. In some embodiments, the two electronic devices are used to navigate content selected from any of the group consisting of: browser page content, web content, video content, electronic book content, and document content. In some embodiments, the first electronic device is a mobile phone with a touch screen display with a graphical user interface. In some embodiments, the information representing the at least the portion of the first intended display to the second electronic device is selected from the group consisting of: display images, data, data pointers, and commands. In some embodiments, the first processing unit is further operative to generate information representing a third intended display for displaying at the first device in response to the second input. In some embodiments, the third intended display for displaying at the first device by the further first processing unit is synchronized with the second intended display at the second device. In some embodiments, the first processing unit is further operative to receive a third input at the first electronic device and to generate information representing a third intended display for the first electronic device and a fourth intended display for the second electronic device. In some embodiments, the first intended display is displayed as a portion of a display at the second electronic device.

In other embodiments, a first electronic device operative to receive a first input and to receive a second input from a second electronic device, where the second input is a representation of a second device input entered by a user at the second electronic device is presented, the first electronic device including: a first processing unit operative to process the first input to generate information representing a first intended display and information representing at least a portion of a second intended display, and further operative to process the second input to generate information representing at least a portion of a third intended display; a first communication interface operative to establish at least one communication channel between the first and second electronic devices over which to call at least one application programming interface to forward the information representing at least the portion of the second intended display to the second electronic device for displaying at least the second intended display, to receive the second input through the at least one communication channel established between the first and second electronic devices, and to call the at least one application programming interface to forward the information representing at least the portion of the third intended display to the second electronic device for displaying at least the third intended display, where the second input is received from the second electronic device in response to the information representing at least portion of the second intended display through the at least one communication channel established between the first and second electronic devices, and where the third intended display is at least an update to the second intended display to be displayed at the second electronic device in response to the second device input by the user; and a first display controller operative to generate first video signals for display on the first electronic device based on the information representing the first intended display. In some embodiments, the first electronic device generates information representing synchronized intended displays to be viewed by the user at the first electronic device and the second electronic device. In some embodiments, the first input is an event selected from the group consisting of: a graphical user interface input, a physical user input and a programmatic input. In some embodiments, the at least one communication channel between the first and the second electronic devices is selected from the group consisting of: a command, an application program interface (API) call, a callback function call, a pipe, a signal, a message, a shared memory, a semaphore, a mutex, a critical section, an event, a socket, a clipboard, a message, and a message queue. In some embodiments, the forwarding of the information representing the at least the portion of the second intended display to the second electronic device is through communication channels between the first and second devices. In some embodiments, the forwarding of the information representing the at least the portion of the third intended display to the second electronic device is through communication channels between the first and second devices. In some embodiments, the second input from the second electronic device includes a navigation command to navigate content generated from the first electronic device and displayed on the second electronic device. In some embodiments, the two electronic devices are used to navigate content selected from any of the group consisting of: browser page content, web content, video content, electronic book content, and document content. In some embodiments, the first electronic device is a mobile phone with a touch screen display with a graphical user interface. In some embodiments, the information representing the second intended display to the second electronic device is selected from the group consisting of: display images, data, data pointers, and commands. In some embodiments, the at least one application programming interface (API) at the first electronic device associated with interacting with the second electronic device is enabled with a multi-tasking operating system of the first electronic device selected from the group consisting of: WINDOWS, WINDOWS CE, WINDOWS mobile, APPLE iPhone system, APPLE OS X, Linux, UNIX, and a UNIX derivative OS. In some embodiments, the second intended display is intended to be displayed as a portion of a screen at the second electronic device. In some embodiments, the third intended display has a resolution optimized for a display of the second electronic device.

In other embodiments, systems are presented including: a first electronic device operative to receive a first input, the first electronic device including: a first data communication unit operative to connect the first electronic device with a second electronic device; a first processing unit operative to process the first input to generate information representing at least a portion of a first intended display, operative to call at least one application programming interface to establish at least one communication channel between the first and second electronic devices using the first data communication unit and to forward the information representing at least the portion of the first intended display to the second electronic device for display, operative to receive and process the information representing the at least a second input provided by the second electronic device through the at least one communication channel established between the first and second electronic devices, and operative to generate information representing at least a portion of a second intended display and information representing a third intended display, and to call the at least one application programming interface to forward the information representing the at least the portion of the second intended display to the second electronic device for display; a first display controller operative to generate a first video signal for display on the first electronic device based on the information representing the third intended display, and where the second electronic device operative to receive the second input, including: a second data communication unit operative to connect the second electronic device with the first electronic device, a second display controller operative to generate a second video signal for display based on the received information representing the at least the portion of the first intended display from the first electronic device and to generate a third video signal for display based on the received information representing the at least the portion of the second intended display, where the second input is provided by the first processing unit operative in response to receiving the information representing the at least the portion of the first intended display; where the second video signal and the third video signal represent related information generated by the first processing unit operative, and a second processing unit operative to forward the information representing the at least the second input to the first electronic device, using the at least one communication channel established between the first and second electronic devices using the second data communication unit. In some embodiments, the first processing unit is further operative to process a command associated with the information representing the at least the second input and operative to generate the at least the portion of the second intended display, where the at least the portion of the second intended display has a resolution optimized for the display of the second electronic device. In some embodiments, the first processing unit is further operative to receive a third input, the third input including an indication to process a toggle operation on a first screen that is displayed at the second electronic device back to a second screen that is displayed at the first electronic device while changing the resolution to be optimized for the first electronic device. In some embodiments, the toggle operation maintains an original output content graphical user interface after toggling an intended display by the first processing unit operative from the first electronic device to the second electronic device; or maintains the original output content graphical user interface after toggling another intended display by the first processing unit operative from the second electronic device to the first electronic device, and where the intermediate position of the digital content represented in the user interface is maintained from the second electronic device back to the first electronic device by the first processing unit operative.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
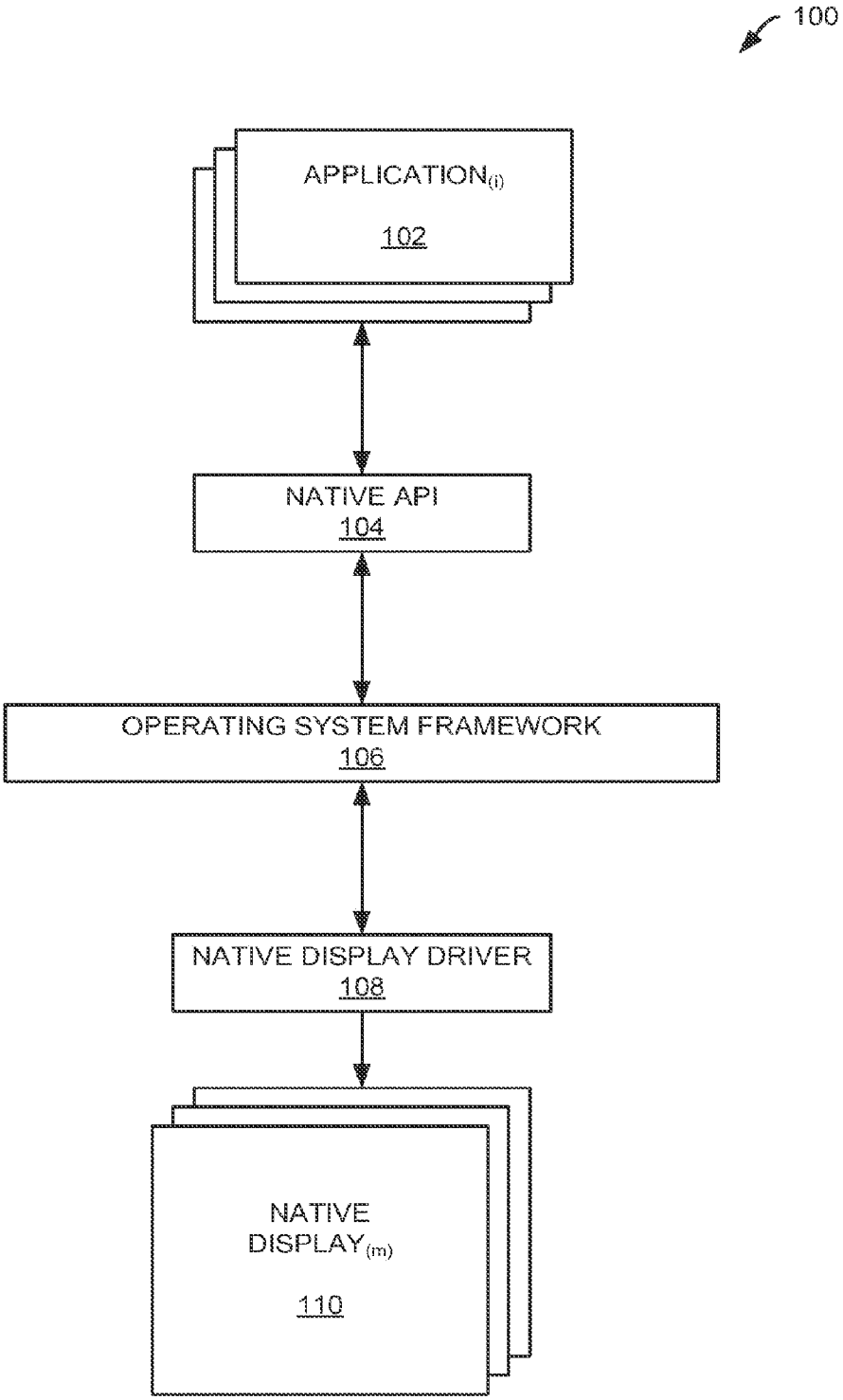
FIG. 1 (PRIOR ART)
FIG. 1 is a prior art illustrative representation of a native display subsystem system for an application that utilizes a native display.

FIG. 1 is a prior art illustrative representation of a native display sub-system 100 for an application 102 that utilizes a native display 110. As noted above, conventional operating system windows managers are typically configured to manage only multiple LCD task windows across multiple LCD displays. As illustrated, applications$_{(1)}$ 102 may be running on a conventional operating system. Application$_{(1)}$ 102 represents any number of applications running concurrently on a computing system. Application$_{(1)}$ 102 may be in cooperative communication with native application programming interface (API) 104. A native API is a source code interface that an operating system or library provides to support requests for native services to be made of it by computer programs such as application$_{(1)}$ 102. Native API 104 communicates with operating system framework 106 to manage data communications from application 102$_{(1)}$. Operating system framework 106 processes data communications and communicates the results of the processing to native display driver 108, which may drive any number of native displays $_{(m)}$ 110 without departing from the present invention. A resulting graphical user interface may then be displayed on native display$_{(m)}$ 110. In some embodiments, native display driver 108 may also be configured as part of a native display subsystem that contains a windows management system along with a UI input system in addition to the native display driver.

Figure 2:
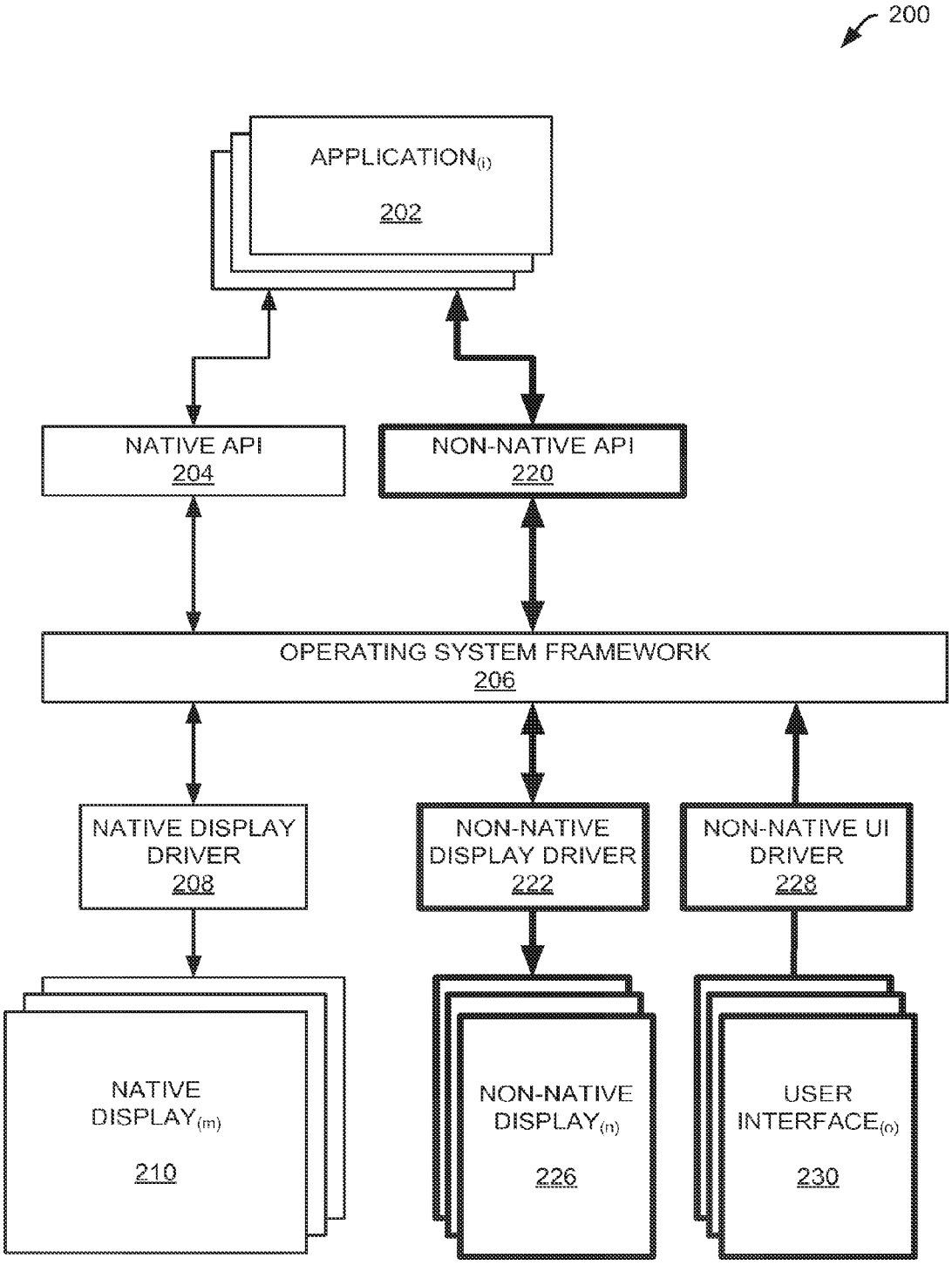
FIG. 2 is an illustrative representation of a native and non-native display subsystem system for utilizing a native display and a non-native display in accordance with embodiments of the present invention.

FIG. 2 is an illustrative representation of a native and non-native display subsystem 200 for utilizing a native display 210 and a non-native display 226 in accordance with embodiments of the present invention. As illustrated, applications$_{(1)}$ 202 may be running on a conventional operating system. In some embodiments, application$_{(1)}$ 202 represents any number of applications running substantially concurrently on an computing system without departing from the present invention. Application$_{(1)}$ 202 may be in cooperative communication with native API 204. In some embodiments, a native API may include: a WINDOWS™ enabled API, a WINDOWS™ CE enabled API, a WINDOWS™ mobile enabled API, an APPLE™ iphone enabled API, An APPLE™ OS X enabled API, a Linux enabled API, a UNIX enabled API, and a UNIX derivative enabled API. A native API is a source code interface that an operating system or library provides to support requests for native services to be made of it by computer programs such as application$_{(1)}$ 202. Native API 204 communicates with operating system framework 206 to manage data communications from application 202$_{(1)}$.

Operating system framework 206 processes data communications and communicates the results of the processing to native display driver 208, which may drive any number of native displays$_{(m)}$ 210. In some embodiments, a native display driver may include: a WINDOWS™ driver, a WINDOWS™ CE driver, a WINDOWS™ mobile driver, an APPLE™ iphone driver, An APPLE™ OS X driver, a Linux driver, a UNIX driver, and a UNIX derivative driver. Operating system framework 206 may be configured to provide any number of system resources without departing from the present invention. In some embodiments, a framework may include: a WINDOWS™ framework, a WINDOWS™ CE framework, a WINDOWS™ mobile framework, an APPLE™ iphone framework, An APPLE™ OS X framework, a Linux framework, a UNIX framework, and a UNIX derivative framework. Native display driver 208 may then send a native display signal to native display$_{(m)}$ 210. A resulting graphical user interface may then be displayed on native display$_{(m)}$ 210. In some embodiments, a native display may be a refresh based high frequency (REHF) display such as: an LCD display, a CRT display, and LED display, a PLED display, an OLED display, and a plasma display.

Heterogeneous display hardware design can deliver many new classes of non-native (i.e., EPD) usage models, including: (1) the capability to extend (or migrate) an native display-based applications to a non-native display for better reading experience where a user may also browse the pages on a non-native display without changing the application; and (2) the ability to create dual-display aware applications that can take advantages of the unique benefits of both native and non-native displays at the same time. As illustrated here, non-native API 220 may be configured to be responsive to programmatic instructions between application$_{(1)}$ 202 and operating system framework 206. In turn, operating system framework 206 processes programmatic instructions and communicates the results of the instructions to non-native display driver 222, which may drive any number of non-native displays$_{(n)}$ 226 by sending a non-native display signal. In some embodiments, non-native display driver 222 may also be configured as part of a non-native display sub-system that contains a non-native windows management system along with a non-native UI input system in addition to the non-native display driver. In some embodiments, a non-native display may be a bistable, low frequency (BILF) display such as an electronic paper display (EPD). In addition, non-native user interface$_{(o)}$ 230 may be utilized to provide navigation control corresponding with applications being displayed on non-native display$_{(n)}$ 226.

As may be appreciated, BILF displays may not be particularly well suited to navigation through a graphical user interface (GUI). One reason for this is because the refresh rate may be too slow to provide an efficient and effective user experience. However, continually transferring GUIs between a BILF and REHF to accomplish all navigation tasks may also detract from a user experience. Thus, at least some navigation capabilities may be desirable. Non-native user interface$_{(o)}$ 230 may include non-native user interface driver 228, which may communicate with application$_{(i)}$ 202 via non-native API 220 through a communication mechanism such as: a command, an API call, a callback function call, a pipe, a signal, a message, a shared memory, a semaphore, a mutex, a critical section, an event, a socket, a clipboard, a message, a message queue or any other communication mechanism known in the art without departing from the present invention. Thus when application initiates contact with non-native driver 222 via non-native API 220, a communication mechanism is configured for non-native driver 222 and application 202. Once a communication mechanism is configured, non-native driver 222 and application 202 may communicate with one another. For the purpose of description, API call and callback is used to explain the communication mechanism between the application and non-native driver.

Figure 3:
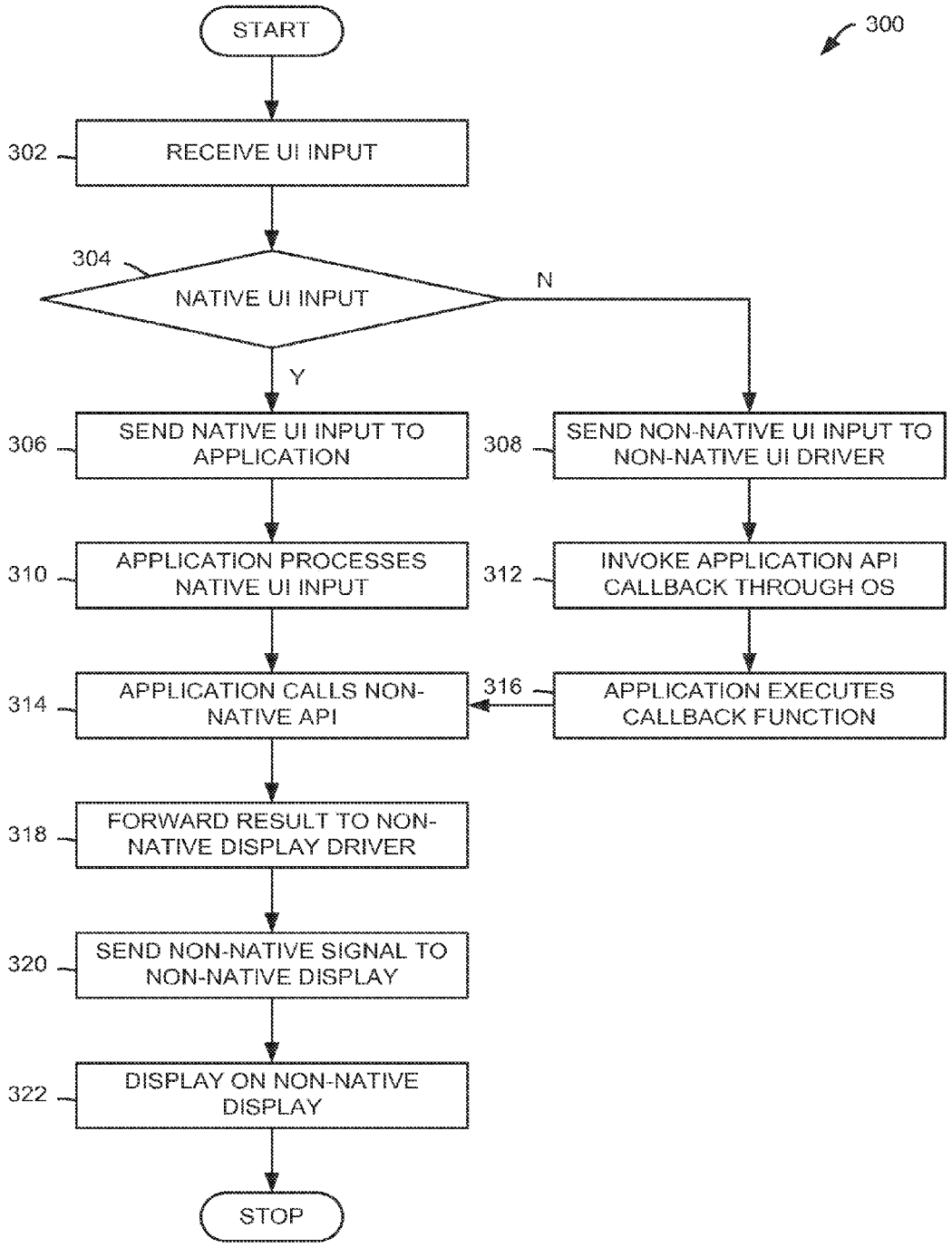
FIG. 3 is an illustrative flowchart of methods for utilizing a non-native API in accordance with embodiments of the present invention.

FIG. 3 is an illustrative flowchart 300 of methods for utilizing a non-native API in accordance with embodiments of the present invention. At a first step 302, a UI input is received. In embodiments, a UI input may include any number of inputs generated from a programmatic related interface, such as a GUI or a physical UI. Inputs may also include programmatic inputs from other sources such as an OS framework, for example, without departing from the present invention. At a next step 304, the method determines whether a UI input is a native UI input. A native UI input, in some embodiments, is any input received from native sources, such as a native GUI or native physical UI. A non-native input, in some embodiments, is any input received from a non-native source, such as a non-native GUI or non-native physical UI. Non-native sources will be discussed in further detail below. If the method determines, at a step 304, that the input is a native UI input, the method proceeds to a step 306 to send the native UI input to a corresponding application. Typically, the native UI input is handled by the operating system (OS). As may be appreciated, a corresponding application may be any application capable of receiving a native UI input as defined herein without departing from the present invention.

At a next step 310, a corresponding application processes the native UI input. The corresponding application may process the native UI input in any manner known in the art without departing from the present invention. Returning to a step 304, if the method determines, at a step 304, that a UI input is a non-native UI input, the method proceeds to a step 308 to send the non-native UI input to a non-native UI driver. Typically, the non-native UI input is handled by the OS. In some embodiments, a non-native UI input may be utilized to provide some navigation capability of a corresponding application. For example, a button or toggle switch may be located on a non-native display to provide user input. As may be appreciated, bistable displays as contemplated herein, are not generally suitable for dynamic GUI input. At least one reason for this characteristic is because refresh rates are typically low (i.e., 1 to 15 frames per second (fps)). Thus, unacceptable latency, when utilizing a GUI, may be introduced and may not provide a satisfactory user experience. Non-native UI inputs may be utilized to overcome this deficiency. At a next step 312, a corresponding application is invoked by a callback function. Typically, a callback function is handled by the OS. As noted above, a callback is executable code that is passed as an argument to other code or application. Callback allows a lower-level software layer to call a subroutine (or function) defined in a higher-level layer. At a next step 316, a corresponding application executes a callback function.

At a next step 314, the method calls a non-native API embodiment. An API is defined at source code level and provides a level of abstraction between the application and the kernel (or other privileged utilities) to ensure the portability of the code. A non-native API, in accordance with embodiments described herein, may be utilized to provide application compatibility with non-native displays. In some embodiments, a non-native display may include a bistable, low frame rate display. In some embodiments, non-native displays may include an electronic paper display (EPD). In some embodiments, an EPD may be configured to refresh at a rate up to approximately 15 fps. At a next step 318, the method forwards the result of the processing of the non-native input to a non-native display driver. In embodiments, the result may be data, a data pointer, or a command. At a next step 320, a non-native signal is sent to a non-native display in accordance with all non-native display requirements, whereupon the non-native signal is displayed on a non-native display at a step 322. The method then ends.

It may be appreciated that any number of corresponding applications may be utilized with embodiments described herein. In some embodiments, inputs may be received from one or more applications. Furthermore, embodiments provided herein may be utilized for enabling complementary dual display utility. For example, a non-native display and a native display may be utilized in concert without restriction. In some embodiments, a native display is a refreshed based high frame rate display. In some embodiments, native displays may include an LCD display, a CRT display, and LED display, a PLED display, an OLED display, and a plasma display. In some embodiments, a native display may be configured to refresh at a rate of approximately 15 to 120 fps. Some embodiments disclosed native displays are intended to function simultaneously with non-native displays without limitation. Native UI inputs may be handled conventionally by a native API to function in concert with non-native UI inputs.

Non-Native API Functions

The following is a list of non-native API functions for providing dual display capability for embodiments described herein. The list is not intended to be exhaustive or self-limiting in any fashion. Additionally, the nomenclature utilized for the functions described is arbitrary and not intended to be limiting in any fashion. Functionality for each term is also included, but the manner in which that functionality is accomplished is not limited in any manner in embodiments described herein.

Initialize( ): This function operates to initialize a non-native display driver. A non-native display driver includes window management capability.

GetDisplayConfig( ): This function operates to GET a current system's complementary display configuration parameters including: number of complementary display parameters, resolution parameters, screen-size/DPI parameters, greyscale/color parameters, and bit-depth parameters.

AllocateEPDWindow( ): This function operates to allocate the following: a non-native display window from a non-native display driver, a display number, a non-native window size/fullscreen, a support/unsupport dynamic non-native window size change, a support/unsupport content synchronization with other applications, a minimal non-native window size, a non-native window name, and a use auto-update or a use manual-update.

ChangeWindow( ); This function operates to change a window size, or move a window to another display (i.e., between native and non-native displays, or any combination thereof).

CloseWindow( ): This function operates to close a non-native display window on a non-native display.

SetSyncContent( ): This function operates to synchronize content from different application windows on a non-native display.

UpdateWindow( ): This function operates to call a non-native display driver to update a non-native display window.

RefreshEPD( ): This function operates to refresh a non-native display.

PrintScreen( ): This function operates to print a screen displayed on a native display to a non-native display.

Non-Native API Callbacks

In addition to the above API functions, a non-native API may include callbacks. As noted above, a callback is executable code that is passed as an argument to other code or application. Callback allows a lower-level software layer to call a subroutine (or function) defined in a higher-level layer. As above, the following is a list of non-native API callbacks for providing dual display capability for embodiments described herein. The list is not intended to be exhaustive or self-limiting in any fashion. Additionally, the nomenclature utilized for the functions described is arbitrary and not intended to be limiting in any fashion. Functionality for each term is also included, but the manner in which that functionality is accomplished is not limited in any manner in embodiments described herein.

OnEPDKeyDown( ): This callback operates to handle non-native UI key events. In some embodiments, key events include: Page Up, Page Down, Switch Window, Size Up, Size Down, Full-screen/Partial-screen.

OnEPDWindowChange( ): This function operates to handle window allocation on non-native displays. For example, an application may allocate a new window on a non-native display when a user engages a Full/Partial screen key thus changing the non-native display window.

OnEPDSyncChange( ): This function operates to handle window updates. For example, if an application's window supports content synchronization, then the application may need to update window content after a synchronization event occurs.

OnEPDOrientChange( ): This function operates to update a non-native window when a non-native display changes orientation.

Use Examples

Figure 4:
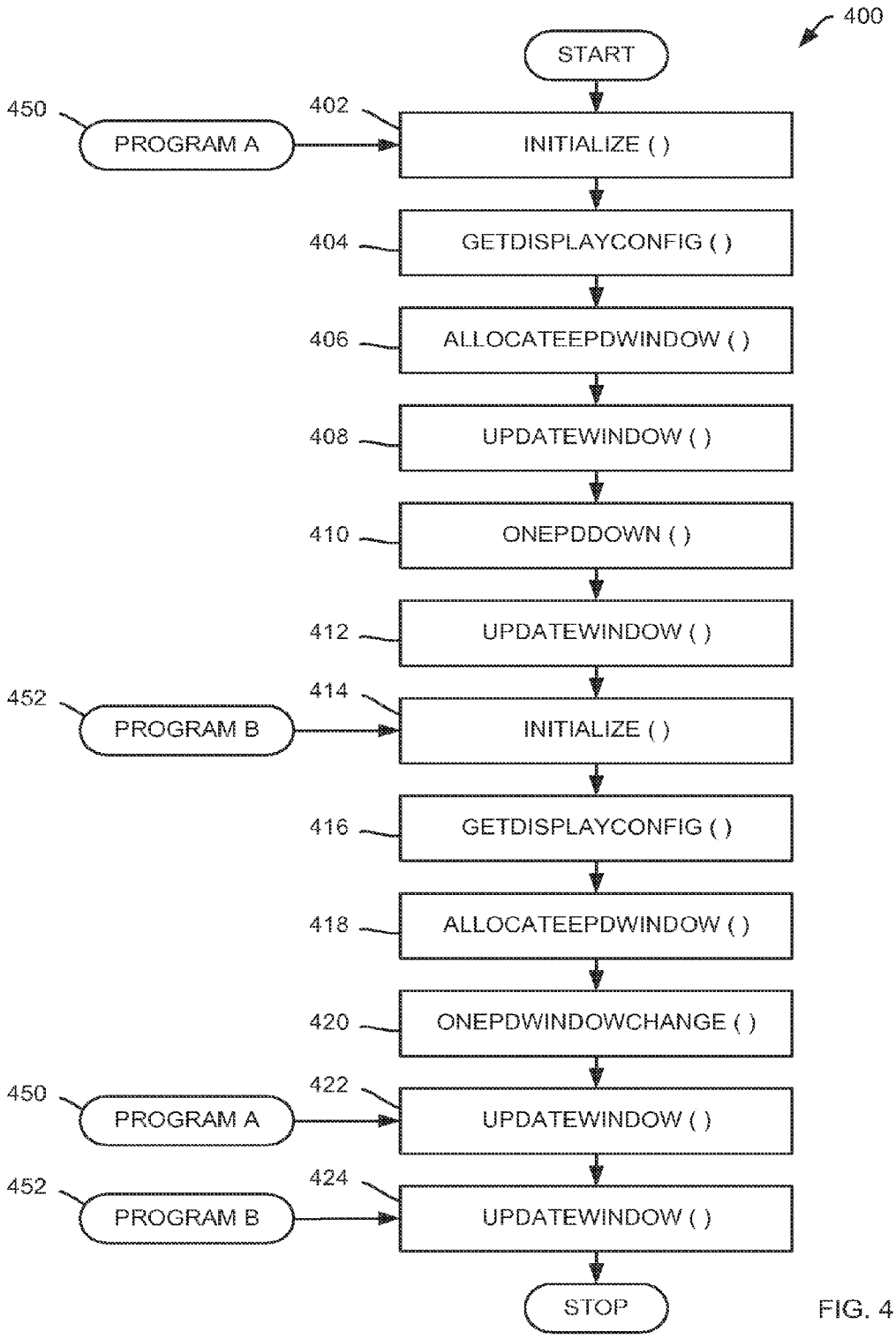
FIG. 4 is an illustrative flowchart of a use case for utilizing multiple applications with a non-native display in accordance with embodiments of the present invention.

A number of use examples are provided for further understanding and clarifying of embodiments of the present invention and are not intended to be limiting in any manner. FIG. 4 is an illustrative flowchart 400 of a use case for utilizing multiple applications with a non-native display in accordance with embodiments of the present invention. In particular, program A 450 operates to display a window on a non-native display whereupon program B 452 adds a new window on the non-native display. At a first step 402, program A 450 connects with a non-native display driver and calls function Initialize 0 to initialize the non-native display driver. At a next step 404, program A 450 calls GetDisplayConfig( ) to gather all current non-native display configurations. Window allocation is handled at a next step 406 by calling AllocateEPDWindow( ). In this example, dynamic-change for the window is supported, At a next step 408, a window update may be made when program A 450 calls UpdateWindow( ). At this point in time, a user may wish to utilize a non-native UI by pressing an event key such as a page down key at a step 410. The user input driver triggers OnEPDKeyDown( ), which is a callback function. Once this event is processed, UpdateWindow( ) is called at a step 412 to refresh the non-native display window.

A second program, program B 452, may then connect with the non-native display driver and call function Initialize( ) to initialize the non-native display driver at a step 414. At a next step 416, program B 452 calls GetDisplay Config( ) to gather all current non-native display configurations. Window allocation is handled at a next step 418 by calling AllocateEPDWindow( ). In this example, program B 452 requests a partial window. At this point program B's 452 window request triggers OnEPDWindowChange( ), which is a callback function. This allows program A's 450 window to change. Thus, at a next step 422, program A 450 calls UpdateWindow( ) to refresh its non-native display window. Subsequently, at a next step 424, program B 452 calls UpdateWindow( ) to refresh its non-native display window. The method then ends. In this manner, FIG. 4 illustrates one example of how two programs (e.g., Program A and B) may share a non-native display screen having two separate windows through the use of the non-native APIs and Callbacks described.

Figure 5:
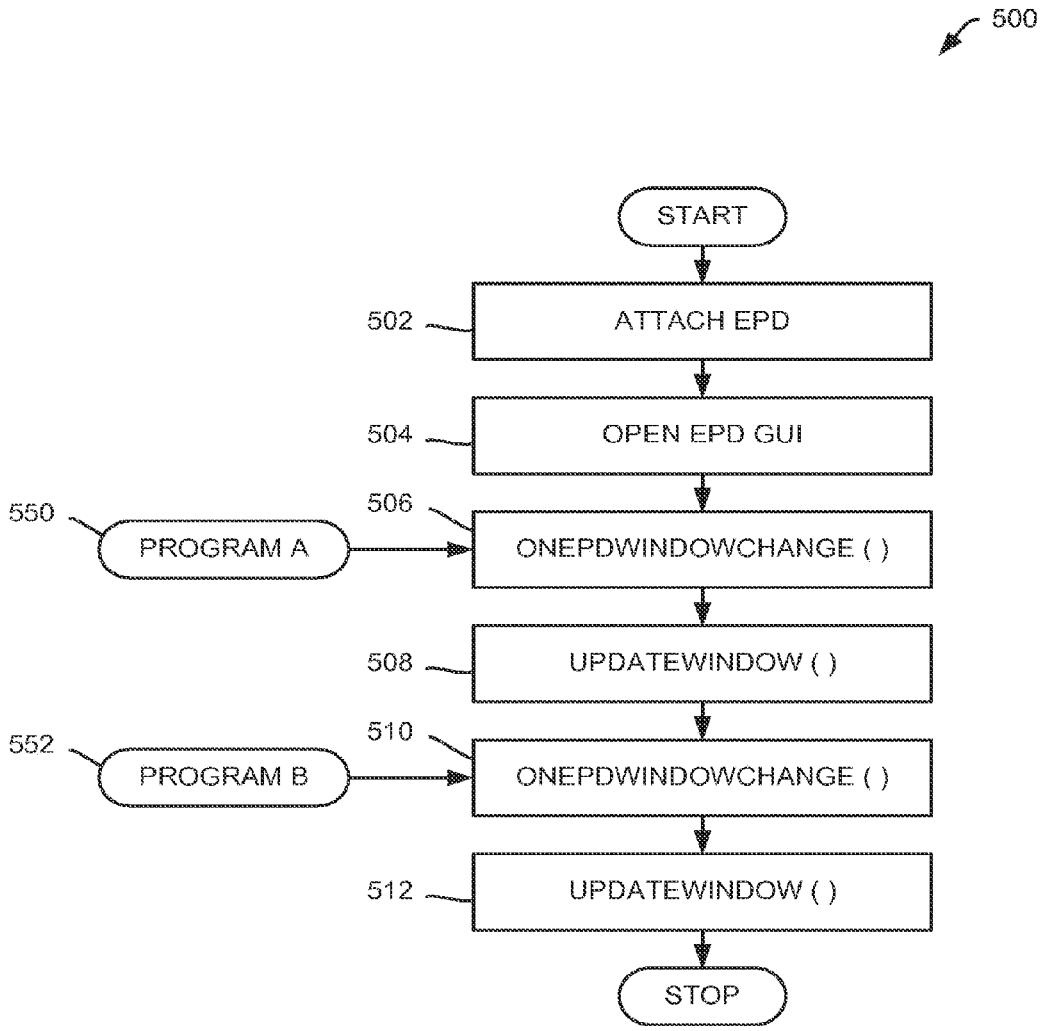
FIG. 5 is an illustrative flowchart of a use case for utilizing multiple applications with multiple non-native displays in accordance with embodiments of the present invention.

FIG. 5 is an illustrative flowchart 500 of a use case for utilizing multiple applications with multiple non-native displays in accordance with embodiments of the present invention. In particular, a second non-native display is added to a system already utilizing a non-native display. At a first step 502, a new non-native display is attached with a current system. A non-native display driver may be configured to detect the addition of the new non-native display. In some embodiments, a native GUI on a native display may be provided to assist in configuring the new non-native display at a step 504. In this example, a user wishes to migrate program A 550 from a current non-native display to a new non-native display via the native GUI. Once the user selection is complete, the non-native display driver triggers an OnEPDWindowChange( ), which is a callback function for program A 550 at a step 506. At a next step 508, program A 550 calls UpdateWindow( ) to refresh the new non-native display. If a second program is present, such as program B 552, a window may be changed when program A 550 is migrated to the new non-native display. Thus, OnEPDWindowChange( ) is triggered for program B 550 at a step 510, whereupon program B 550 calls Update Window( ) to refresh the current non-native display at a step 512. The method then ends. In this manner one or more programs may utilize a non-native display being added to a system. In addition, a window may be moved from one non-native display to another.

Figure 6:
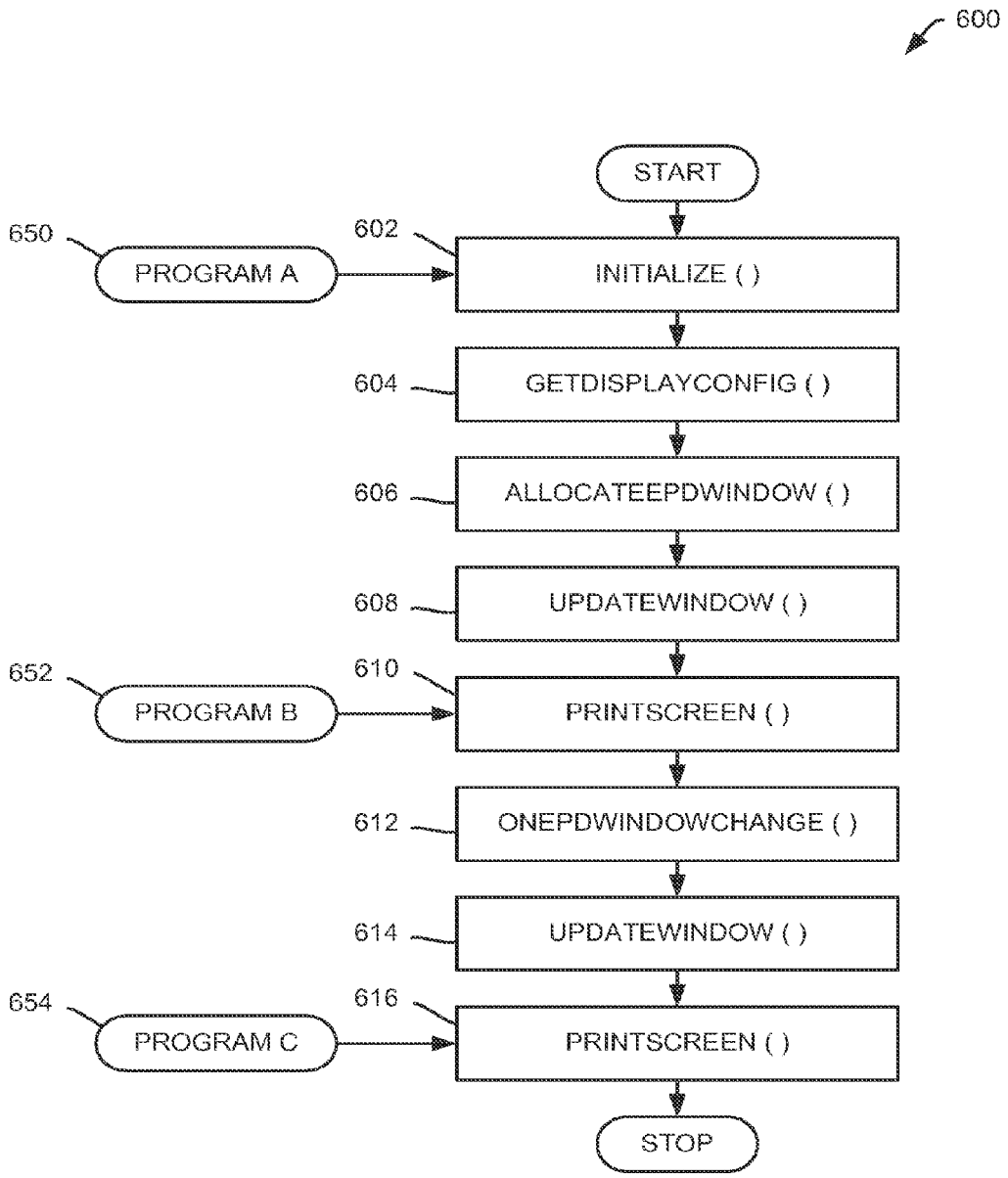
FIG. 6 is an illustrative flowchart of a use case for utilizing multiple applications with native and non-native displays in accordance with embodiments of the present invention.

FIG. 6 is an illustrative flowchart 600 of a use case for utilizing multiple applications with native and non-native displays in accordance with embodiments of the present invention. In particular, three programs originating on the native display may be subsequently displayed on a non-native display. At a first step 602, program A 650 connects with a non-native display driver and calls function Initialize( ) to initialize a non-native display driver. At a next o step 604, program A 650 calls GetDisplayConfig( ) to gather all current non-native display configurations. Window allocation is handled at a next step 606 by calling AllocateEPDWindow( ). In this example, dynamic-change for the window is supported. At a next step 608, a window update may be made when program A 650 calls UpdateWindow( ). At some point, program B 652 is started on a native display. At a next step 610, program B 652 calls PrintScreen( ) to print a screen displayed on the native display to the non-native display. To print program B 652 to the non-native display, OnEPDWindowChange( ) is triggered for program B 550 at a step 612, whereupon program B 550 calls UpdateWindow( ) to refresh the current non-native display at a step 614. At some point, program C 654 is started on a native display. At a next step 616, program C 654 calls PrintScreen( ), to print a screen displayed on the native display to the non-native display. As above, program C may be configured to trigger similar actions like Program B, however detailed steps are not repeated here. The method then ends. In this manner, any number of applications may print a screen from a native display to a non-native display.

Furthermore, a program may toggle a window of the program or a "frame" of a window of the program from a native display to a non-native display. A "frame" in the case of a HTML browser program allows an author to divide a browser window into multiple (rectangular) regions. Multiple documents may be displayed in a single window, each within its own frame. Graphical browsers allow these frames to be scrolled independently of each other, and links may update a document displayed in one frame without affecting the others. Therefore, a frame is like a rectangular region inside a window for a browser program or any other program. The following two examples illustrate "toggle window" and "toggle frame".

"Toggle Window" Example

Application A originally utilizes multiple windows on one or more native displays. In order to utilize a non-native display, application A changes its implement of creating and updating one of the windows previously displayed on a native display. Application A connects with a non-native display driver, acquires a new non-native display window by a call such as AllocateEPDWindows( ), draws the original window's content to the new non-native window, and then calls UpdateWindow( ) to update the non-native window's content to the non-native display. All remaining original windows may still be displayed on native display, and may receive user input. This method of migrating an application is referred to as, "toggle window." The method described here is typically used by a dual-display aware program that is written to access both the native and non-native displays at the same time.

"Toggle Frame" Example

Application B originally utilizes multiple frames (regions inside a window) in a window on a native display. In this example, one frame may contain an independently scrollable text content that can be easily displayed on a single display thus requiring scrolling or some other method (such as Page Down button) for access. In order to utilize a non-native display, application B connects with a non-native display driver, acquires a new non-native display window by calling AllocateEPDWindows( ), draws its frame's content to a non-native window, and calls UpdateWindow( ) to update non-native window content to a non-native display. A non-native page down input command may be invoked by a non-native UI, and sent to application B through a non-native API. Application B then processes the non-native page down input command, updates its non-native window content. Application B's frame content may continue to show or hide on native display. That is, the application may continue to receive user input. This method of migrating applications is referred to as, "toggle frame."

Figure 7:
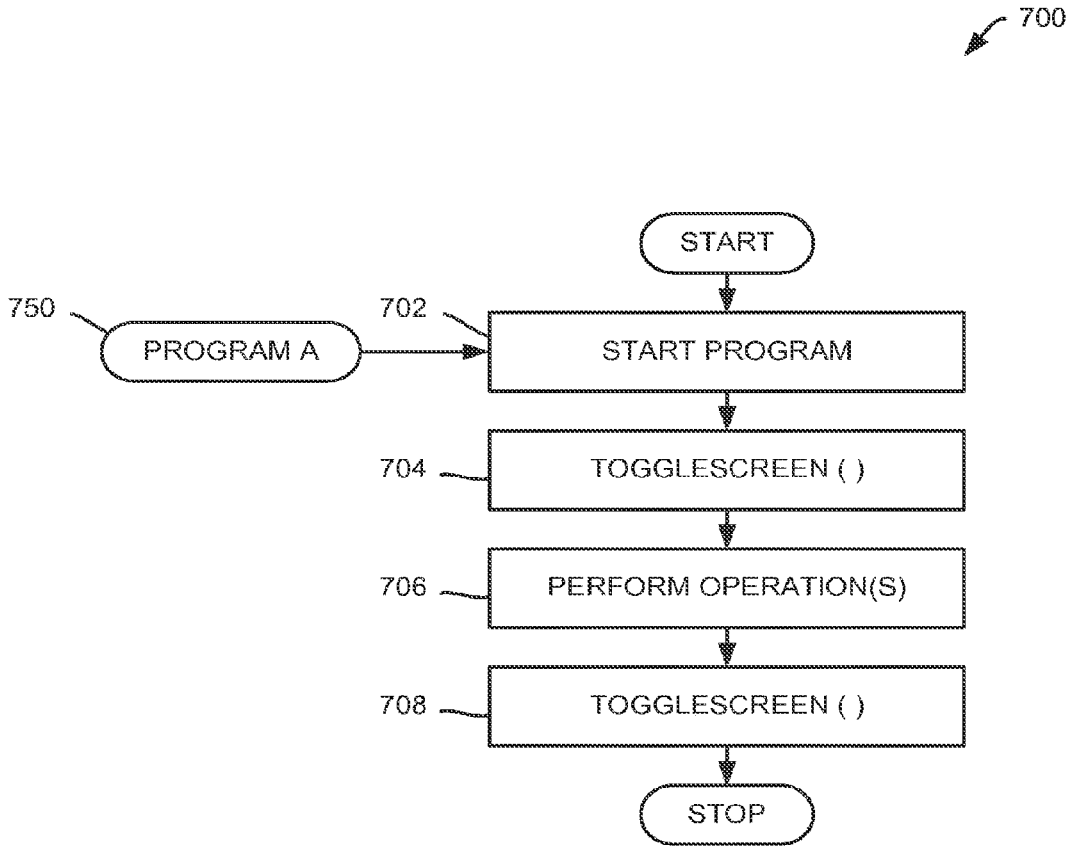
FIG. 7 is an illustrative flowchart of a use case for utilizing an application with native and non-native displays in accordance with embodiments of the present invention.
Figure 8:
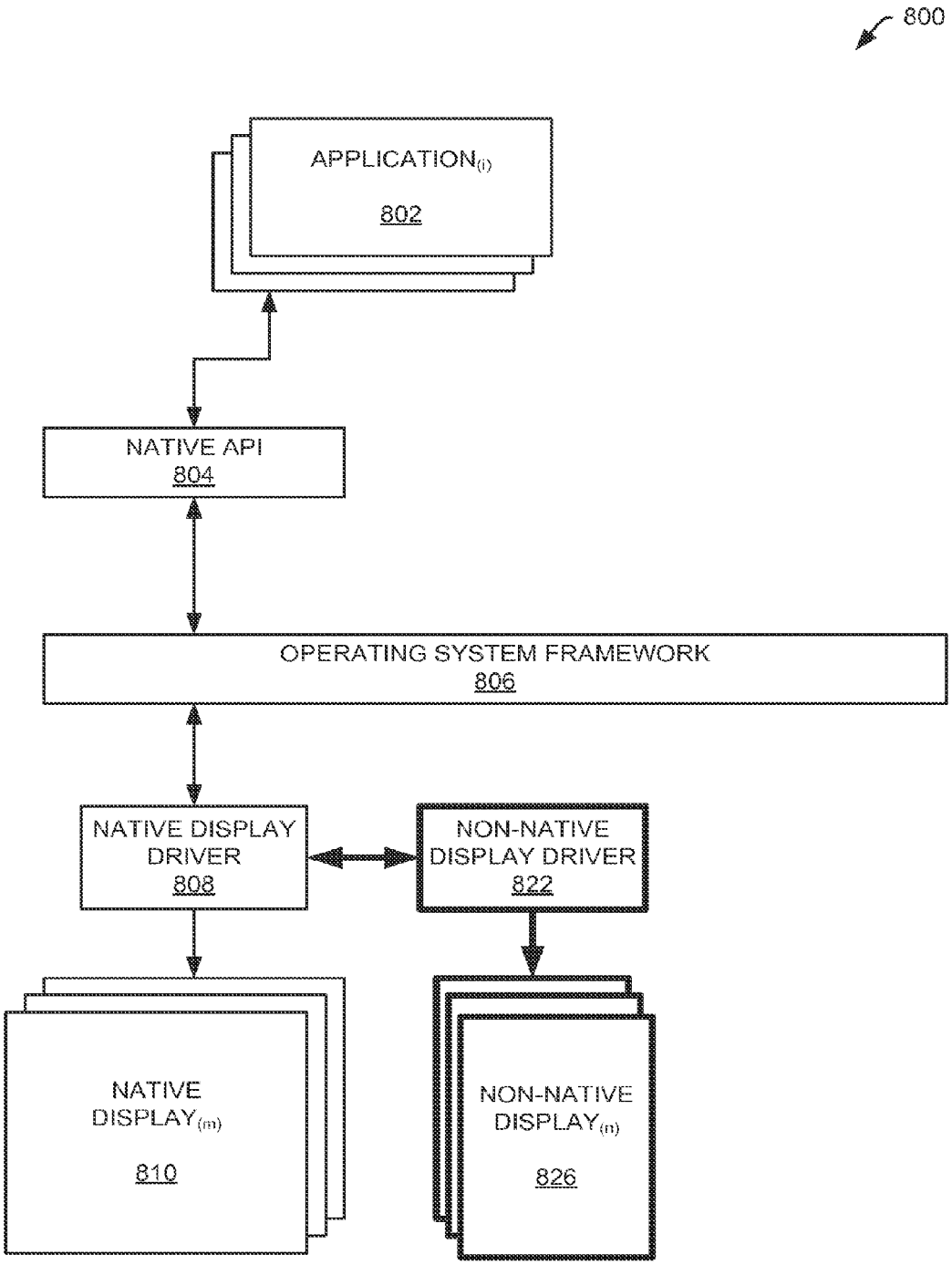
FIG. 8 is an illustrative representation of a native and non-native display subsystem for utilizing a native display and a non-native display in accordance with embodiments of the present invention.

The above "toggle window" and "toggle frame" examples describe applications that are dual-display aware when they are written. For legacy LCD-only applications that have not been migrated to non-native displays, a method for migrating applications referred to as "toggle screen" may be useful to provide non-native display without a need for utilizing any additional programmatic code above the OS framework. FIG. 7 is an illustrative flowchart 700 of a use case for utilizing an application with native and non-native displays in accordance with embodiments of the present invention. In particular, this example demonstrates the use of toggle screen in embodiments provided. FIG. 7 will be discussed in connection with FIG. 8, which is an illustrative representation of a native and non-native display subsystem 800 for utilizing a native display 810 and a non-native display 826 in accordance with embodiments of the present invention. In particular, FIG. 8 illustrates one extension of FIG. 2. As illustrated, applications$_{(1)}$ 802 may be running on a conventional operating system framework 806. Applications$_{(1)}$ 802 may be in cooperative communication with native API 804. Applications$_{(1)}$ 802 may not be aware of the existence of non-native display 826 or of non-native display driver 822. As illustrated, native display driver 808 may handle communication with non-native display driver 822.

As noted above, non-native displays may not be well-suited for navigating an application due to latency issues. Toggling allows a user to easily migrate an application between a non-native display and a native display so that navigation may proceed on the most appropriate platform. Returning to FIG. 7, at a first step 702, program A 750 (i.e. applications$_{(i)}$ 802, FIG. 8) is started on a native display such as native display 810. In embodiments, programs may display content on a native display utilizing any graphical user interface such as a window or frame without limitation. To toggle, ToggleScreen( ) may be triggered at a step 704. To toggle, a native display driver 808 may send display data and command data generated by applications$_{(1)}$ 802 (program A 750) to non-native display driver 822. Non-native display driver 822 may operate to first extend applications$_{(1)}$ 802 (program A 750) native display window to a non-native display window resolution and then display the non-native display window on non-native display 826. In embodiments, programs may display content on a non-native display utilizing any graphical user interface such as a window or frame without limitation. Returning to FIG. 7, at a next step 706, any number of non-native display operations may occur, such as scroll, page down, page up, etc. When a user desires to migrate applications$_{(1)}$ 802 (program A 750) back to a native display 810, the method triggers Toggle Screen( ) at a step 708. The method then ends. Native display driver 808 stops sending display data and command data to non-native display driver 822 and continues to draw content on native display 810.

It may be noted that printing an application to a non-native display as described for FIG. 6 is different than toggling an application to a non-native display as described for FIG. 7. In printing, a window is displayed on a non-native display, but functionality of the application remains with a native display. This may be useful in situations where a user desired to keep a high resolution screen shot of a reading program while continuing to navigate the application. Toggling, on the other hand, migrates the application to the non-native display. Thus, if additional navigation is needed, other than what is provided by non-native UI inputs, the application must be migrated back to a native display.

Additional Features

It may be appreciated that additional features may be incorporated into use models described herein. Any combination of these features may be utilized without departing from the present invention.

Native Display On/Off

In embodiments, in order to conserve battery power while utilizing a non-native display, a user may use an additional UI (which may, in some embodiments, be a non-native UI) to turn the native display on and off. Turning a native display off during non-native display use may reduce power consumption due to the backlight of a native display. When the native display is turned off, the system may be further configured to enter a standby power-saving mode much like a phone device. In standby mode a system would typically "wake-up" in order to update the non-native display when content has been changed (e.g., by a page change when reading a book). When a user turns the native display on the systems may be configured to enter dual display mode operation again.

Video Out of Native or Non-Native Display Screens

In embodiments, to facilitate public viewing of native and non-native display content through a projector, a user may use an additional UI to select whether to project content from either native or non-native displays to a video out port of the device. Traditionally, video output was limited to native display content.

Non-Native Windows Manager

In embodiments, a system utilizing a non-native display windows manger with a non-native display driver as described herein may support multiple windows (of the same program or different programs) on one or more non-native display screens. An additional UI may provide functionality which allows a user to select an active window (from a list of non-native display windows working under the operating system) and display the updated content on the non-native display. Furthermore, the additional UI may provide functionality which allows a user to change the size of window from a partial screen size to a full screen size (and vice versa). Thus, resizing functionality may be provided. These features may be beneficial for users viewing content across multiple windows on a non-native display without requiring them to turn on the native display to navigate content.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A system comprising[:

a first electronic device] *memory with instructions encoded thereon, an operating system framework, and one or more processors that, when executing the instructions, are caused to perform operations* comprising:

[a first processing unit operative to generate] *generating* a first [intended] image *to be drawn* on a [first screen that is a full screen image at the first electronic device] *native window at a native display for navigation* by executing [at least one of a plurality of corresponding applications of the first processing unit] *an application in communication with the operating system framework, wherein native user inputs received from native sources are processed to update the native window*;

[and operative to generate information representing at least a portion of] *generating* a second [intended] image to be drawn on a *non-native* window [area] on a [second screen at a second electronic device from] *non-native display based on at least a portion of* content [accessible] *shown in the first image* by [at least one of the plurality of corresponding applications] *the application* responding to an event [at the first electronic device], wherein the second [intended] image is distinct from the first [intended] image and [is optimized] *has a layout on the non-native display* based on resolution information of [the] *a non-native* window [area] of the [second screen] *non-native display*,

[and operative to forward the information representing at least the portion of] *forwarding* the second [intended] image to the [second screen] *non-native window* for display by calling at least one application programming interface (API) by executing [at least one of the plural of corresponding applications] *the application in communication with the operating system framework, wherein the application migrates from the native window of the native display to the non-native window of the non-native display and enables the corresponding non-native inputs to continue the navigation at the non-native display*; *and*

[and further operative to receive and process] *receiving and processing* a [representation of a second] *non-native* input initiated by a user at [the second electronic device] *a non-native user input interface* in response to the second [intended] image by executing [at least one of the plurality of corresponding applications] *the application in communication with the operating system framework*, and [operative to forward information representing at least a portion of] *forwarding* a third [intended] image to *update* the [second screen] *non-native window* that is generated as a result of processing the [second] *non-native* input [at the first electronic device] by executing [at least one of the plurality of corresponding applications, wherein the second device and the second screen could be configured within the first electronic device] *the application in communication with the operating system framework, wherein non-native user inputs received from non-native sources are different from the native sources*.

2. The system of claim 1, wherein the second [intended] image is drawn to the *non-native* window [area] of the [second electronic device] *non-native display* based on "toggle frame" to [synchronize] *draw content of* a HyperText Markup Language (HTML) frame from *the native window of* the [first screen] *native display that has multiple frames,* to the *non-native* window [area] of the [second screen] *non-native display*, wherein the [information and images] *second image* drawn on the *non-native* window [area] is based on a document content related [to-the] *to the* HTML frame of the [first screen] *native display*, wherein the *second* image drawn [is optimized] *has a layout on the non-native display* based on the resolution information of the *non-native* window [area] of the [second screen] *non-native display*, wherein the second [intended] image drawn *using the HTML frame* is distinct from the first [intended] image of the [first electronic device] *native display*, wherein the [full screen of the first electronic device] *native display* has at least one HTML [windows] *window* that contains the HTML frame *as one of the multiple frames in the native window*.

3. The system of claim 1, wherein the [user input at the second device] *reception of the non-native input* is configured through executing at least one of a callback application programming interface by [at least one of the plural of corresponding applications] *the application*.

4. The system of claim 1, wherein the [plurality of corresponding applications of the first processing unit are designed to work together] *application is configured* to do the following [intended] tasks: to create and show the first and the second [intended] images[that are distinct and synchronized], and to [update the first intended image after] *determine whether a user input is a native user input or a non-native user input before* processing the user input[associated with the second intended image of the window area on the second screen at the second electronic device].

5. The system of claim 1, wherein the *non-native* window [area] of the [second screen] *non-native display* is a full screen window of the [second electronic device] *non-native display*.

6. The system of claim 1, wherein a communication channel between the [first electronic device] *native display* and the [second electronic device] *non-native display* is based on wired or wireless communication network.

7. The system of claim 1, wherein the [first] event is an input selected from the group consisting of: a graphical user interface input, a physical user input and a programmatic [input] *related interface such as an operating system* (*OS*) *framework.*

8. The system of claim 1, wherein the *non-native* user input [at the second electronic device] comprises a navigation command to navigate content generated from the [first electronic device] *application* and displayed on the [second electronic device] *non-native display*.

9. The system of claim 8, wherein the [two electronic devices] *native display and the non-native display* are used to navigate *browser* content[selected from any of the group consisting of: browser page content, web content, video content, electronic book content, and document content].

10. The system of claim 1, wherein the [second electronic device] *non-native display* has a graphical user interface that [is synchronized with] *includes content that is based on at least a portion of* the [content] *first image* displayed on the [first screen of the first electronic device] *native display, and the graphical user interface of the non-native display is used for content navigation while the native display is turned off.*

11. The system of claim 1, wherein the second [intended] image is displayed as a [portion] *partial screen window* of the [second screen at the second electronic device] *non-native display*.

12. The system of claim 1, wherein the at least one application programming interface (API) [at the first electronic device associated with interacting with the second electronic device] is enabled with a multi-tasking operating system[of the first electronic device selected from the group consisting of: WINDOWS, WINDOWS CE, WINDOWS mobile, APPLE iPhone system, APPLE OS X, Linux, UNIX, and a UNIX derivative OS].

* * * * *